Feb. 8, 1949.   E. J. HENNINGSEN   2,460,935
BOAT TRAILER COMBINATION
Filed Dec. 17, 1945                                           2 Sheets-Sheet 1

INVENTOR
EMANUEL JACK HENNINGSEN
BY Liverance and Van Antwerp
ATTORNEYS

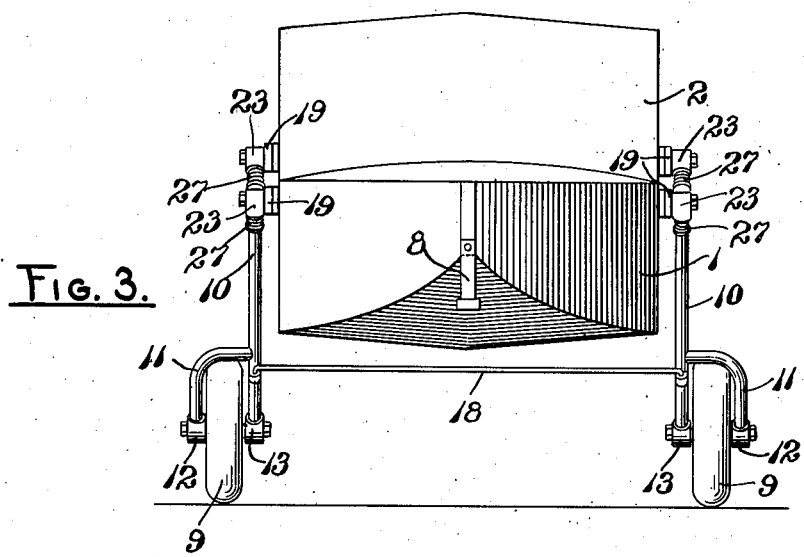
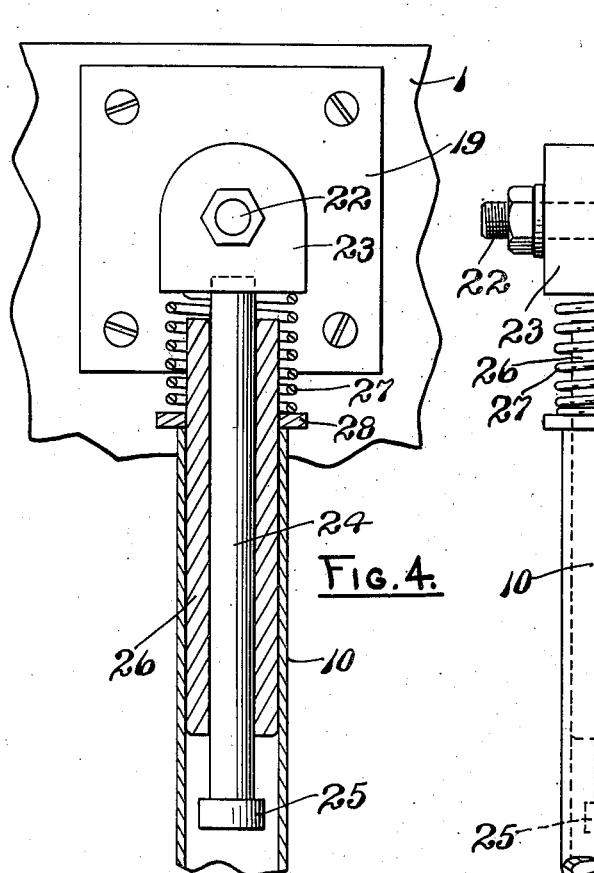
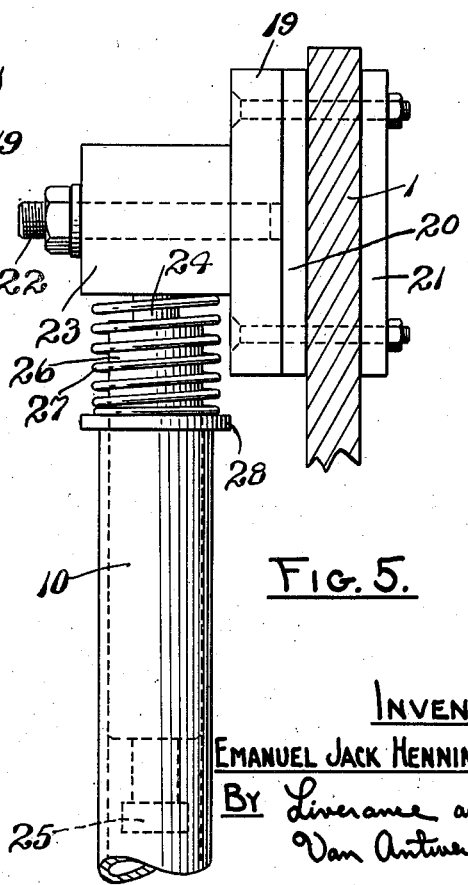

Patented Feb. 8, 1949

2,460,935

UNITED STATES PATENT OFFICE 2,460,935

BOAT TRAILER COMBINATION

Emanuel Jack Henningsen, Grand Rapids, Mich.

Application December 17, 1945, Serial No. 635,467

7 Claims. (Cl. 9—2)

The present invention relates to a boat and trailer combination in which the boat is made of two hinged sections which in an unfolded position are in longitudinal alinement. The rear section may be folded to lie over the other, decreasing the length when in such folded condition, and providing a trailer body. Associated with the two sections of the boat are supporting wheels which in the folded position are moved to a level below the bottom of the lowermost section of the folded trailer to engage the ground for drawing the trailer thereover and which when the upper section is unfolded and brought into alinement with the lower section are lifted to a level above the bottom of the boat and are held in such upper position and may be carried by the boat one at each side thereof, in its use upon the water.

It is a primary purpose and object of the present invention to provide such carrying wheels so that in its folded trailer condition the structure may be readily drawn like any trailer over the road, by attachment to an automobile or other motor vehicle, and by which, by mere unfolding convert the trailer body into a boat, the wheels being automatically elevated above the bottom of the boat and held in such position when the structure serves as a boat, and moved downwardly into carrying position when the boat is converted into a trailer without necessity of the carrying wheel structure being applied and removed when converting from boat to trailer or vice versa.

An understanding of the invention may be had from the following description taken in connection with the accompanying drawing, in which, Fig. 1 is a side elevation of my invention in its folded trailer condition.

Fig. 3 is a front end elevation looking at the right end of Fig. 1.

Fig. 4 is a fragmentary enlarged partial side elevation and vertical section of the attaching means for the carriage wheels attached at opposite sides of the boat.

Fig. 5 is an elevation and transverse vertical section at right angles to the section in Fig. 4.

Like reference characters refer to like parts in the different figures of the drawings.

Figure 1:
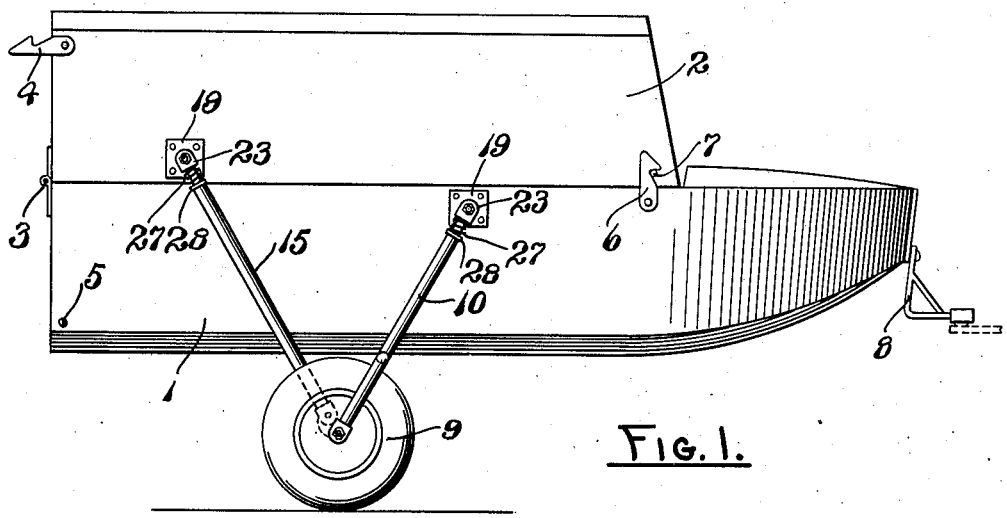

In the illustrated construction, a front boat section 1 and a rear boat section 2 are connected by hinges 3 at adjacent rear and front ends respectively, it being understood that the front section 1 will have a vertical back and the rear section 2 a front vertical end, at the free edges of which the hinges 3 are secured. Hooks 4 and pins 5, to be engaged thereby are carried by the sides of the rear section 2 and the front section 1, respectively, near their adjacent ends when in unfolded position as in Fig. 2; and similar hooks 6 on the sides of the boat section 1, and pins 7 on the sides of the section 2, are located to be detachably connected together when the rear section 2 is folded over and onto the front section 1, as in Fig. 1. In the folded position a body is provided within which numerous articles to be transported may be placed. At the front end of the front section 1, a bracket 8, for connection with a coupling bracket at the rear end of an automobile is mounted. It may be turned to a lower operative position as in Fig. 1, or an upper inoperative position when, as in Fig. 2, the structure is to be used as a boat.

Two carrying wheels 9 are provided for drawing the trailer over the road one in each side of the boat. At each side of the front section 1 of the boat, a tubular post 10 is located adjacent its lower end being provided with a laterally extending arm 11, which terminates in a portion parallel to the post 10. At the free end of the arm 11 and the adjacent end of the post 10, blocks 12 and 13 are secured respectively, as shown, through which an axle rod 14, on which the wheel 9 is mounted, passes. At each side of the rear section 2 of the boat a similar tubular post 15 is located having a fork 16 at its lower end which is pivotally connected to a short arm 17 extending to one side of the block 13 and cast or otherwise permanently secured thereto. The posts 10 may be connected by cross rod 18 (Fig. 3) when they are in their down trailer carrying position to strengthen the posts against bending or buckling outwardly. Said rod is removed from sockets on post 10 when the wheels are elevated, as shown in Fig. 2, and the structure is to be used as a boat.

The upper ends of the posts 10 and 15 are connected respectively to the sides of the front and rear sections 1 and 2, using the same structure for each. A plate 19 is connected by bolts which pass therethrough and also through inner and outer plates 20 and 21 at the inner and outer sides of the sides of sections 1 and 2 thereby securing a plate 19 to each side of each boot section. From each of said plates 19, a rod 22 threaded at its outer end extends horizontally. A block 23 is mounted to turn on each rod 22 from which a rod 24 extends having a head 25 at its free end (Fig. 4). The rod passes through a sleeve 26 permanently secured at the adjacent end of each post 10 and 15, and extending beyond said end. A relatively heavy coiled compression spring 27 is disposed between each block 23 and a flat ring 28 at the upper end of each post 10 and 15, said spring telescoping over the projecting end of its associated sleeve 26.

Figure 2:
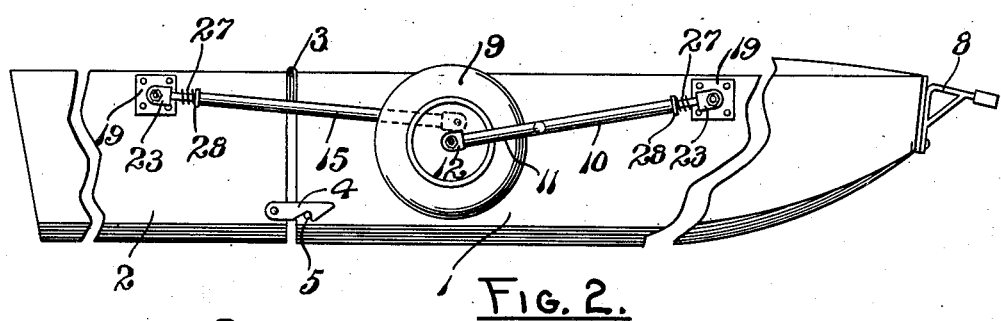
Fig. 2 is a similar elevation when the upper section has been unfolded to the rear to provide a boat and the carrying wheels lifted to upper position.
Figures 6, 7:
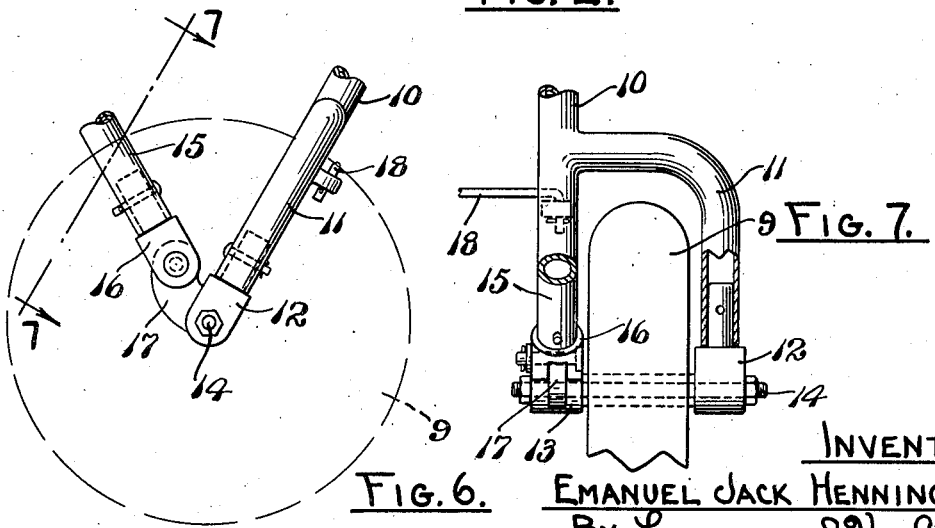
Fig. 6 is a fragmentary enlarged side elevation of the lower end of said carriage where a wheel is mounted.
Fig. 7 is a transverse generally vertical section and elevation substantially on the plane of line 7—7 of Fig. 6, looking in the direction indicated by arrows.

When the structure is folded as a trailer, as in Fig. 1, the plates 19 on the two sections 1 and 2 are brought closer together than when unfolded, as in Fig. 2. The posts 10 and 15 are thereupon automatically moved so that the wheels 9 are carried downwardly to a position below the bottom of the lower section 1 as shown in Fig. 1. The springs 27 serve to cushion road shocks when the trailer is being drawn to its destination, where unfolded, as in Fig. 2, to serve as a boat, said plates are moved further apart, drawing the head 25 of rods 24 against the inner ends of the sleeves 26, thereupon lifting the wheels 9 to position, one at each side of the boat as in Fig. 2, in which position they will be held as the knuckle of a diagrammatic toggle lever at the hinges 3, will in effect pass across from one side to the other of a dead center line, and the wheels 9 will not drop until the section 2 has been turned toward its folded position until the posts 15 cross the horizontal pivotal axis of the hinges 3.

The construction described is practical and useful. With it no separate truck for carrying the folded boat or a trailer is required, but the wheels and the carrying structure therefor remain connected with the boat sections 1 and 2 at all times. The structure is relatively inexpensive to build, and serves its purpose as a trailer and also as boat in a fully satisfactory manner.

The invention is defined in the appended claims and is to be considered comprehensive of all forms of structure coming within their scope.

I claim:

1. In a structure as described, a front boat section having a rear closed end, a rear boat section having a closed front end, means hingedly connecting said boat sections at the rear end of the front and the front end of the rear section, a post connected at the outside of each side of the front boat section, a wheel carried at the lower end of each post, and a second post connected at the outside of each side of the rear boat section each of said second posts extending to and having a pivotal connection with the unattached end of the other post on the common side of said sections, as and for the purposes described.

2. A construction as defined in claim 1, each of said posts being formed of two parts, one of which is telescopically received in the other, and stop means for limiting the elongation of said posts.

3. In a construction as described, front and rear boat sections adapted to be located in alinement having closed adjacent ends, hinges connecting adjacent ends of the sections at the upper portions thereof, a rod pivotally mounted at one end to turn about a horizontal axis at the outside of each side of each boat section, a tubular post in axial alinement with each rod, a sleeve through which each rod passes extending into and permanently connected with its associated post, each rod having a head at its inner end and the associated sleeve being of a length shorter than the length of the rod, a wheel mounted for rotating movement about a horizontal axis mounted at the opposite end of each of the posts connected to the front boat section, and pivotal connections between the lower ends of the posts at the same sides of the front boat section.

4. A construction as defined in claim 3, each of said rods at its upper end having permanent connection to a block mounted to turn about a horizontal axis, a flat ring at the upper end of each of the adjacent posts and a coiled compression spring between associated blocks and rings.

5. A construction as defined in claim 4, and a cross rod extending between and detachably connected at its ends to the posts carried by the front boat section.

6. In a structure as described, a front and a rear boat section adapted to be located in alinement, means hingedly connecting said boat sections at adjacent ends whereby the rear section may be swung upwardly and over, to lie upon and above the front section, a wheel at each side of the front boat section, two elongated members, one at each side of the front boat section at one end of each of which a wheel is rotatably mounted, means pivotally connecting each of said elongated members at its other end, one to each side of the front boat section to turn about a horizontal axis, and means connected one to each side of the rear boat section and one to each of said elongated members for moving said wheels upwardly, one at the outside of each side of the front boat section when said front and rear sections are in alinement and for lowering said wheels when the rear boat section is swung to its upper position over the front boat section.

7. In a structure as described, a front and a rear boat section adapted to be located in alinement, means hingedly connecting said boat sections at adjacent ends whereby the rear section may be swung upwardly and over to lie upon and above the front section, a wheel at each side of the front boat section, means for swingably connecting each wheel with its associated side of the front boat section for movement between upper and lower positions, and means movably connected with the same sides of the rear boat section and with said first mentioned means for moving said wheels between said positions, one, alongside the sides of the front boat section when said front and rear boat sections are in alinement, and the other upon swinging the rear boat section over and above the front boat section.

EMANUEL JACK HENNINGSEN.

REFERENCES CITED

The following references are of record in the file of this patent:

UNITED STATES PATENTS

| Number | Name | Date |
| --- | --- | --- |
| 1,246,373 | Adams | Nov. 13, 1917 |
| 1,691,633 | Bertram | Nov. 13, 1928 |

FOREIGN PATENTS

| Number | Country | Date |
| --- | --- | --- |
| 28,809 | Australia, 1930 | May 14, 1931 |